United States Patent
Poggiolini

Patent Number: 5,127,066
Date of Patent: Jun. 30, 1992

[54] COHERENT OPTICAL-FIBER COMMUNICATION SYSTEM USING POLARIZATION DIVERSITY TRANSMISSION

[75] Inventor: Pierluigi Poggiolini, Turin, Italy

[73] Assignee: CSELT - Centro Studi e Laboratori Telecommunicazioni S.p.A., Turin, Italy

[21] Appl. No.: 608,499

[22] Filed: Nov. 2, 1990

[30] Foreign Application Priority Data

Nov. 14, 1989 [IT] Italy ................ 67995 A/89

[51] Int. Cl.⁵ .............................................. G02B 6/28
[52] U.S. Cl. .............................. 385/24; 385/31; 385/11
[58] Field of Search ............ 350/96.13, 96.14, 96.15, 350/96.16, 96.17, 320; 455/610, 612; 385/24-32, 1-11

[56] References Cited

U.S. PATENT DOCUMENTS

| | | | |
|---|---|---|---|
| 4,549,781 | 10/1985 | Bhagavatula | 350/96.30 |
| 4,560,246 | 12/1985 | Cotter | 350/320 X |
| 4,875,215 | 10/1989 | Hughes | 350/96.15 X |
| 4,973,169 | 11/1990 | Slonecker | 350/96.16 |
| 4,977,593 | 12/1990 | Ballance | 455/612 |

Primary Examiner—John D. Lee
Assistant Examiner—Phan T. Heartney
Attorney, Agent, or Firm—Herbert Dubno

[57] ABSTRACT

A coherent optical-fiber transmission system is rendered insensitive to fluctuations of the state of polarization of the electromagnetic field due to propagation along the fiber by varying at the transmitting side the state of polarization of the optical carrier modulated by the information signal to be transmitted. The variation is such that spectral broadening of the intermediate frequency signal at the receiver is kept limited, while reception of half the power outgoing from the fiber is ensured.

8 Claims, 2 Drawing Sheets

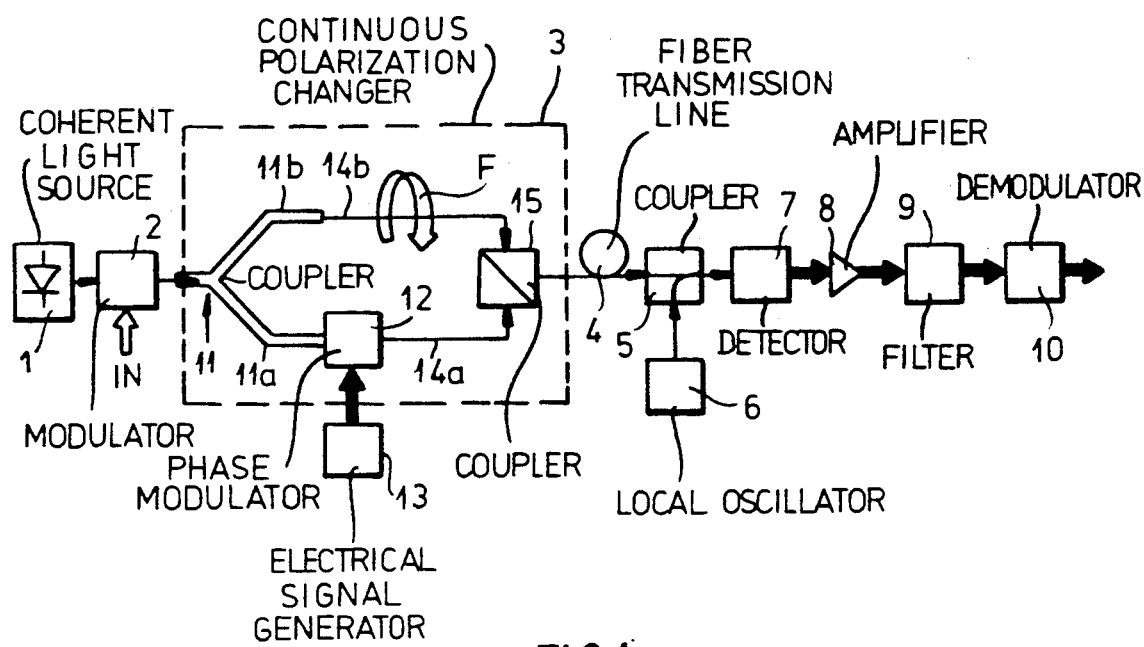
FIG.1
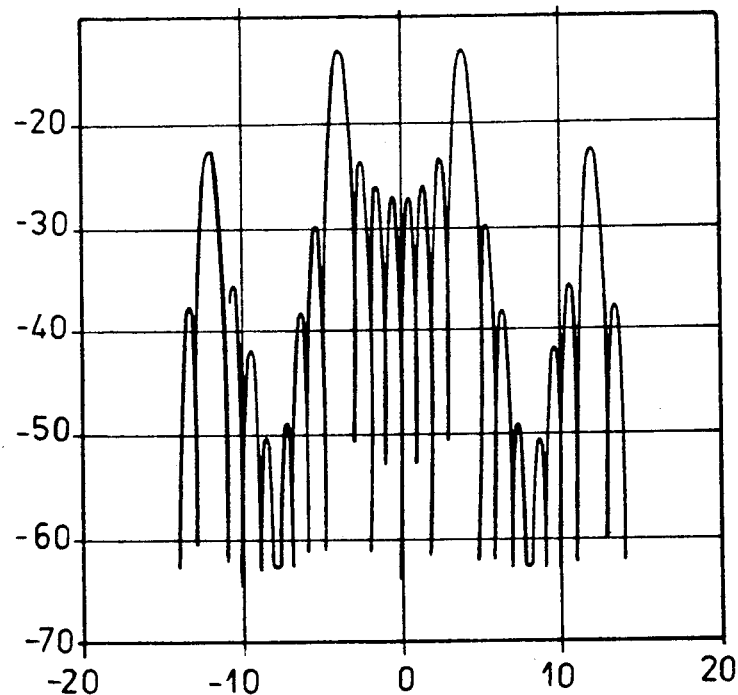
FIG.2 — PRIOR ART.

COHERENT OPTICAL-FIBER COMMUNICATION SYSTEM USING POLARIZATION DIVERSITY TRANSMISSION

FIELD OF THE INVENTION

The present invention refers to optical fiber communication systems and more particularly, to a coherent communication system using polarization-diversity transmission, i.e. a system in which the state of polarization of an optical carrier already modulated by a digital data signal is changed at the transmitting side.

BACKGROUND OF THE INVENTION

It is known that conventional single-mode fibers (i.e. fibers not maintaining polarisation) used in optical-fiber communication systems have birefringence characteristics varying with both distance and time, thus causing the state of polarization of the signals propagating along the fiber to change in a continuous and unpredictable manner. In the case of coherent communication systems with heterodyne reception, which are the most widely used, the receivers can operate correctly only if the state of polarization of the received signal matches that of the signal emitted by the local oscillator; otherwise, only a part of the field undergoes heterodyne conversion. As a consequence even complete signal fading can occur. The importance of polarization-insensitive communication systems is therefore evident.

The proposed solutions to such a problem operate at either the receiving or the transmitting side.

The solutions based on intervention at the receiving side exploit polarization tracking receivers or polarization-diversity receivers. Polarization tracking receivers require an endless polarization transformer and a proper automatic control circuit; polarization-diversity receivers require two complete demodulating electronic stages in addition to a polarization splitter or, in case of balanced receivers, at least two such splitters and a polarization-independent 3 dB coupler. For actual introduction into industrial scale systems, the receivers should be monolithic integrated components, preferably of semiconductor material; however, at the present state of the art, both the development of integrated components carrying out the functions required with good performance, and the production of such units or an industrial scale with acceptable yield, present considerable difficulties. Furthermore, in one of the most interesting applications of coherent optical communication systems, such systems should be introduced into distribution networks, wherein a single source sends the information towards a plurality of receivers. In such a case the above-mentioned solutions have the further disadvantage that the devices rendering the system insensitive to polarization fluctuations ought to be associated with each receiver, thus increasing system complexity and costs.

The solutions based on interventions at the transmitting side are based on a fast switching of the polarization state of the signal to be transmitted. An example of these solutions is described by T. G. Hodgkinson, R. A. Harmona and D. W. Smith in the paper entitled Polarization-insensitive heterodyne detection using polarization scrambling. In this known system the transmitter comprises, between an amplitude modulator which modulates an optical carrier emitted by a laser with the data signal and the optical fiber, a polarization scrambler forcing the optical signal to switch between two orthogonal polarization states at a frequency equal to four times the symbol frequency. The polarization scrambler comprises a 1:1 fiber coupler sharing the signal in equal parts between two separate paths. One of these paths includes a waveguide phase modulator controlled by a square wave at the desired switching frequency, preceded by a polarization control device, which produces a correct state at the phase modulator input. The two paths join then at a second, polarization-selective coupler, to which the fiber is connected.

A device of this kind overcomes the disadvantages above, even if it entails the loss of half the power which can be received. In fact polarization switching is a simpler function than those carried out by endless polarization transformers, and can be implemented with devices which are less complex than those used in polarization diversity receivers and which are already available in integrated form. In addition, when used in a distribution network, the devices which render the system polarization-insensitive can be provided only in the transmitter, which is unique, and not in each receiver, so that the system complexity is not significantly increased.

Polarization switching gives rise to bandwidth problems at the receiver. In fact, the bandwidth required for the intermediate frequency filter in the receiver is approximately given by the bandwidth of the data signal (which, for an ASK system, as used in the system of the cited paper, has at least a main lobe whose width is equal to twice the symbol frequency) plus twice the switching frequency of the state of polarization. Spectrum broadening gives rise to many difficulties: 1) it is necessary to operate, at intermediate frequency, with electronic circuits with much wider bandwidth than is necessary in the absence of polarization switching; 2) the intermediate frequency, receiver is negatively affected by the very high level of the secondary lobes originating in the spectrum. Necessary to operate at rather high intermediate frequencies to prevent spectrum foldover around the origin of the frequencies from interfering with the main lobes of the useful signal; 3) a penalty is introduced in terms of the signal power necessary to obtain a certain error probability with respect to an ideal system operating without polarization switching. This penalty is due to the fact that the intermediate frequency filter requires greater signal amplitude and hence allows the passage of a larger amount of noise.

Operating at very high bit rates, like those generally envisaged for optical fiber systems (of the order of hundreds of Mbits/s or of Gbits/s) and at switching frequencies which are a multiple of the symbol frequency, as in the case of the above mentioned known system, the phenomena cited under 1) and 2) can make practical implementation of the system very difficult and expensive, or even impossible, since they involve the use of extremely fast electronics, up to the limits of the present technology. The phenomenon cited under 3) negatively affects system performance.

OBJECT OF THE INVENTION

It is an object of the present invention to provide a digital signals over a single-mode optical, and an optical communication system using the method, wherein insensitivity to polarization fluctuations in the fiber is obtained by polarization-diversity transmission, and wherein polarization diversity is obtained so as to cause a rather reduced spectrum broadening, as compared to polarization switching methods, while still allowing recovery of half the power transmitted.

SUMMARY OF THE INVENTION

The method of transmitting digital signals on a single-mode optical wherein the digital signals modulate an optical carrier of the invention, is characterised in that, prior to sending the modulated carrier into the fiber, the state of polarization of the modulated carrier is made to vary continuously, during at least one symbol period, so as to distribute the power associated with each transmitted symbol over a continuous range of states of polarization.

A continuous variation of the state of polarisation at the transmitter allows a continuous intermediate frequency electrical signal to be obtained at the receiving side, while the switching between two discrete states gives a discontinuous intermediate frequency signal. The advantages, in terms of spectral characteristics, of a continuous signal as compared with a discontinuous signal, are well known from communications theory.

According to a first aspect of the invention, this variation is such that the vector representative of the electromagnetic field on the Poincaré sphere moves by one complete revolution on a great circle of the sphere itself in one symbol period. The vector rotation occurs at a constant angular speed or, in other terms, the angle increases in time with a linear law.

According to a second aspect of the invention, the variation of the state of polarization of the electromagnetic field is such that the vector representing the state of polarization on the Poincaré sphere moves on a great circle of such a sphere by an angle increasing in time according to a sinusoidal function of period equal to symbol period, the total displacement being equal to an angle $2\tau$ such that $Jo(\tau)=0$, where Jo is the 0 order Bessel function.

The above condition is obtained by imposing that in a symbol period the detected power is independent of the transformations induced in the fiber and equal to half the power arriving at the receiver.

The invention comprises also a further object of the invention a coherent optical-fiber communication system using a single-mode optical fiber as transmission medium, wherein, at the transmitting side, there are provided means for generating an optical carrier modulated by a digital information signal, and means for scrambling the state of polarization of the modulated carrier. The scrambling means are arranged to vary the state of polarization continuously during a symbol period, so as to distribute the power associated with each transmitted symbol over different states of polarization.

BRIEF DESCRIPTION OF THE DRAWING

The above and other objects, features and advantages of the present invention will become more readily apparent from the following description, reference being made to the accompanying drawing in which:

FIG. 1 is a schematic representation of a preferred embodiment of a coherent communication system using the invention;

FIG. 2 is a diagram of the intermediate frequency signal power spectrum in the receiver of a known system.

SPECIFIC DESCRIPTION

Figure 3:
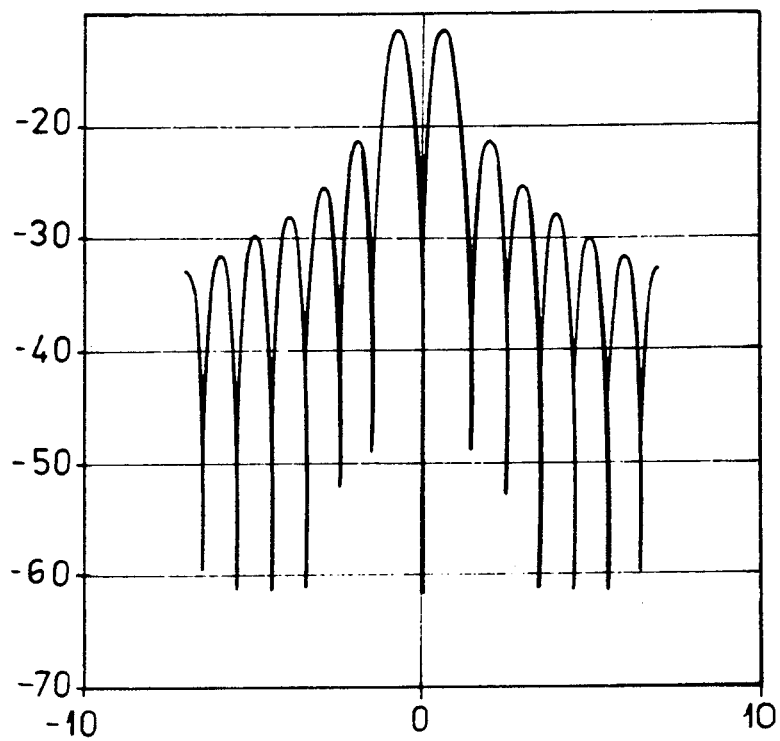
FIGS. 3, 4 are diagrams similar to FIG. 2, relevant to the two aspects of the invention.

In the drawing, thin lines represent optical fiber connections, double lines represent integrated optical guide connections and heavy lines electrical connections.

As shown in FIG. 1, a coherent optical fiber transmission system comprises a source 1 emitting an optical carrier which is modulated in a modulator 2 by the digital information signal IN. As an alternative, source 1 of the optical carrier could be directly modulated, without use of an external modulator, for instance in optical transmission systems operating according to an FSK modulation scheme. However, the type of modulation is of no interest for the present invention. The modulated optical carrier is then fed to a device 3, which, at each symbol period, causes the state of polarization of the modulated carrier to continuously change as described hereinafter, by using an electrical signal supplied by a generator 13. The signal which has undergone a polarization modulation (or scrambling) is sent to transmission line 4, consisting of a conventional single-mode fiber. In the receiver, the signal coming from fiber 4 is combined in a coupler 5 with the signal emitted by a local oscillator 6 and the signal outgoing from the coupler is converted by detector 7 into the intermediate frequency electrical signal. Detector 7 is followed by conventional circuits for processing the electrical signal, more particularly an amplifier 8, an intermediate frequency filter 9 and a demodulator 10.

Device 3 can basically have the same structure as the polarization scrambler described in the above mentioned paper. It will then comprise a coupler 11, for sharing the power associated with the modulated carrier into basically equal parts between the two paths 11a, 11b. The whole of elements 11, 11a, 11b is advantageously implemented as an integrate-component. One of the two paths, e.g. path 11a, comprises a phase modulator 12 driven by voltage generator 13 and generating a modulation directly proportional to the applied voltage. Even modulator 12 can be an integrated component. The signal outgoing from modulator 12 and the signal sent along path 11b are then sent into respective polarization maintaining fiber trunks 14a, 14b. Fiber trunk 14b is mounted on a support (not shown) which allows a 90° rotation of its end portion, as schematically illustration by arrow F, so as to enable device 3 to scramble polarization. The two optical fiber trunks end at a polarization selective coupler 15 (e.g. a polarizing beam splitter) which couples into fiber 4 the optical power present in the two paths of device 3.

It can be demonstrated that the application of a phase modulation equal to an angle $\alpha$ on path 11a through phase modulator 12, induces a rotation by an angle $2\alpha$, on a great circle of the Poincaré sphere, of the vector representing the state of polarization of the field outgoing from device 3. Thus, to implement the first aspect of the method according to the invention, a phase modulation with linear law with respect to time and equal to 180° in the symbol period can be applied on path 11a, inducing then a complete revolution (360°) of the vector representing the state of polarization. According to the convention generally adopted, that the equator of the Poincaré sphere is the locus of the linear polarizations and the poles represent circular polarizations, by the solution described, the vector representing the state of polarization in transmission moves along a meridian.

Phase $\alpha$ can be reset at each symbol period. Yet that entails a $\pi$ phase jump of the electromagnetic field which further broadens the spectrum. Preferably therefore phase α is caused to undergo a total 360° change in two consecutive symbol periods, so that the fast return to the initial value 0° does not ideally cause any phase discontinuity in the field. The increment of α from 180° to 360° in the second symbol period induces a further complete revolution of the vector representing the state of polarization on the same great circle of the Poincaré sphere, and in the same direction of rotation. Thus, this method too implements the first aspect of the invention.

Since modulator 12 induces a phase modulation which is directly proportional to the applied voltage, when the first aspect of the invention is being carried out, generator 13 can be a generator of a sawtooth voltage, whose period is equal to the symbol period or preferably to twice the symbol period, for the above-mentioned reasons. The tooth amplitude in both cases will be such as to cause a 180° or, respectively, a 360° variation of phase α.

As an alternative, to implement the second aspect of the invention, generator 13 can supply a sinusoidal voltage, with period equal to symbol period and an amplitude such that peak-to-peak phase difference α is equal to angle τ, expressed in radians (about 2.4048 radians), which renders the 0 order Bessel function Jo(τ) null.

For simplicity sake, the means necessary to lock the phase modulator timing to the information signal timing are not shown in the drawing.

Figure 4:
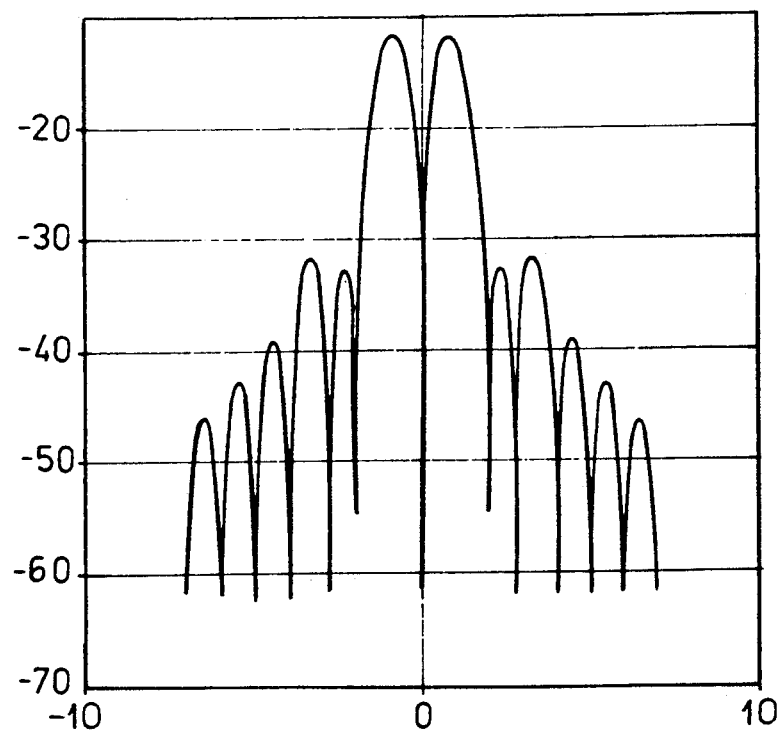

FIGS. 2, 3, 4 show the continuous spectrum portion of the intermediate frequency signal in case of a polarization switching system as that described in the cited paper (FIG. 2) and of a system according to the invention, in its first and second aspects (FIGS. 3, 4, respectively). The functions of which the spectra are the graphic representation are obtained by applying the usual spectral analysis techniques to the intermediate frequency signal, supposing that the modulation of the optical carrier in modulator 2 is an ASK modulation, that local oscillator 6 emits a linearly polarized radiation and that the fiber effect on the state of polarization of the electromagnetic field launched into the fiber can be represented by a so-called Jones birefringence matrix.

In FIGS. 2-4 the power in dB is plotted on the ordinate and the bandwidth, expressed in multiples of the symbol frequency, is plotted on the abscissa, abscissa value 0 corresponding to intermediate frequency. Comparison of the spectra clearly shows the improvement obtained by use of the invention. In fact, in the case of polarization switching (FIG. 2), to exploit at least the power associated with the two main lobes, the necessary band is on the whole about ten times the symbol frequency; besides there is a very slow degradation of secondary lobes. Using the first aspect of the invention (FIG. 3), most of the power is concentrated in a band reduced to about 3 times the symbol frequency and the secondary lobe levels are lower than in case of polarization switching. Finally, by using the second aspect of the invention (FIG. 4), the main lobes have an overall width slightly greater than in the preceding case (about four times instead of three times the symbol frequency) but the secondary lobes are much less important.

Variations and modifications are possible without departing from the scope of the invention. E.g. two phase modulators, one for each path, generating equal and opposed phase variations, or two amplitude modulators, one for each path, might be used instead of the single phase modulator 12 on path 11a. In the latter case, the vector representative of the state of polarization will move along the Poincaré sphere equator. It is however to be noted that the described solution is the simplest one to implement under present technology conditions.

I claim:

1. A polarization-insensitive method of transmitting digital signals on a single-mode optical fiber so as to be insensitive to unpredictable variations of fiber birefringence, wherein said digital signals modulate an optical carrier, comprising prior to sending the modulated carrier into the fiber, continuously varying state of polarization of the modulated carrier during at least one symbol period, to distribute over a continuous range of polarization states a power associated with each transmitted symbol, and sharing the power associated with the modulated carrier, prior to transmission on the fiber, between two different paths joining at an input of the fiber, said state of polarization is made to vary along at least one of said paths by phase modulation.

2. The method defined in claim 1 wherein said variation of the state of polarization is such that the vector representing the state of polarization of the electromagnetic field on the Poincaré sphere rotates by a complete revolution (360°) on a great circle of the sphere itself during a symbol period.

3. The method defined in claim 2 wherein the rotation of the vector representing the state of polarization polarization of the electromagnetic field occurs at a constant angular speed.

4. A polarization-insensitive method of transmitting digital signals on a single-mode optical fiber so as to be insensitive to unpredictable variations of fiber birefringence, wherein said digital signals modulate an optical carrier, comprising prior to sending the modulated carrier into the fiber, continuously varying state of polarization of the modulated carrier during at least one symbol period, to distribute over a continuous range of polarization states a power associated with each transmitted symbol, said variation of the state of polarization being such that the vector representing the state polarization of the electromagnetic field on a Poincaré sphere moves on a great circle of such a sphere by an angel increasing with time according to a sinusoidal function whose period is equal to the symbol period, the total amount of the displacement being equal to an angle (2 τ) such that Jo(τ)=0, where Jo is the 0 order Bessel function.

5. A coherent optical communication system using a single-mode optical fiber as transmission medium, wherein, at a transmitting side, means are provided for generating an optical carrier modulated by a digital information signal, as well as means for scrambling the state of polarization of the modulated carrier, said scrambling means including means for changing a state of polarization continuously, during at least one symbol period, so as to distribute over different states of polarization a power associated with each transmitted symbol, said means for scrambling comprising a coupler for sharing the power associated with said modulated carrier, prior to transmission on the fiber, between two different paths joining at an input of the fiber, at least one of said paths including a modulator of the phase of said carrier, said modulator being driven by a generator of a sawtooth electrical signal, whose period is equal to a symbol period and whose amplitude is such as to induce at 180° peak-to-peak phase modulation.

6. A coherent optical communication system using a single-mode optical fiber as transmission medium, wherein, at a transmitting side, means are provided for generating an optical carrier modulated by a digital information signal, as well as means for scrambling the state of polarization of the modulated carrier, said scrambling means including means for changing a state of polarization continuously, during at least one symbol period, so as to distribute over different states of polarization a power associated with each transmitted symbol, said means for scrambling including a coupler for sharing the power associated with the modulated carrier, prior to transmission on the fiber, between two different paths joining at an input of the fiber, at least one of said paths including a modulator of the phase of said carrier, driven by a generator of a sawtooth electrical signal, whose period is equal to two symbol periods and whose amplitude is such as to induce a 360° peak-to-peak phase modulation.

7. A coherent optical communication system using a single-mode optical fiber as transmission medium, wherein, at a transmitting side, means are provided for generating an optical carrier modulated by a digital information signal, as well as means for scrambling the state of polarization of the modulated carrier, said scrambling means including means for changing a state of polarization continuously, during at least one symbol period, so as to distribute over different states of polarization a power associated with each transmitted symbol, said means for scrambling including a coupler for sharing the power associated with the modulated carrier, prior to transmission on the fiber, between two different paths joining at an input of the fiber, at least one of said paths including a modulator of the phase of said carrier, driven by a generator of a sinusoidal electrical signal whose period is equal to a symbol period and whose amplitude is such that the peak-to-peak phase difference induced by the phase modulator on said path is $\pi$, $\pi$ being an angle, expressed in radians making 0 order Bessel function $J_0(\pi)$ null.

8. A polarization-insensitive method of transmitting digital signals on a single-mode optical fiber so as to be insensitive to unpredictable variations of fiber birefringence, comprising the steps of:
  (a) supplying an optical carrier modulated with digital signals having symbol periods to an input of a continuous polarization changer;
  (b) in said continuous polarization changer continuously varying a state of polarization of a signal transmitted through said polarization changer during at least one symbol period so as to distribute a power associated with each transmitted symbol represented by modulation of said carrier over a continuous range of polarization states and so that during a symbol period a vector representing a state of polarization on a Poincaré sphere rotates by 360° with uniform speed on a great circle of said sphere or moves by a predetermined angle on a great circle of said sphere in accordance with a sinusoidal law; and
  (c) transmitting a signal outputted by said polarization changer and having the continuously varying state of polarization along said optical fiber.

* * * * *